United States Patent Office 2,758,029
Patented Aug. 7, 1956

2,758,029

PROCESS OF MAKING COLORED PICTURES

Victor Fu-Hua Chu, Metuchen, N. J., assignor to E. I. du Pont de Nemours and Company, Wilmington, Del., a corporation of Delaware No Drawing. Application April 10, 1953, Serial No. 348,093

12 Claims. (Cl. 95—88)

This invention relates to photography and more particularly to a process for making a colored dye image in the light-sensitive silver halide layer of a photographic element which layer contains a hydroxyl polymer color-former. Still more particularly it relates to a process for obtaining multicolor pictures in an exposed multilayer photographic film element wherein the outer photographic silver halide emulsion layer contains a hydroxyl polymer color-former wherein the color-former nuclei contain activated methylene groups.

Various photographic films for color photography have been proposed wherein the light-sensitive, water-permeable colloid layers contain a substantial proportion of or are composed essentially of polymeric color-formers wherein color-former nuclei are linked to a vinyl alcohol polymer of high molecular weight, e. g., polyvinyl alcohol or a partially hydrolyzed polyvinyl ester or a partial acetal thereof, with non-color-forming aldehydes or ketones. These color-former nuclei are linked directly or indirectly through an ether linkage or preferably an acetal linkage to the polymer chain. The color-former nuclei have as the active group a structure which may be represented by the formula:

$$X-(\overset{|}{C}=\overset{|}{C})_n-\overset{|}{C}=\overset{|}{C}H$$

wherein X is HO— or RHN—, wherein R is hydrogen or an aliphatic group and $n$ is 0 or 1. The "free" or "dangling" valences may, of course, be satisfied by various atoms or groups, e. g., hydrogen, halogen, carboxylic or sulfonic acid groups and their derivatives, fused rings, alkyl, aryl, alkoxy, aryloxy, etc. The hydrogen atom in the formula may be replaced by groups readily displaced in the coupling reaction, e. g., halogen atoms, carboxylic or sulfonic acid groups.

The active group is found in the active methylene color formers or dye intermediates and in aromatic hydroxyl and amino compounds and includes the reactive ethenol, aminoethenyl, 4 - hydroxy- and 4 - amino - 1,3-butadienyl groups. These groups occur in phenols, naphthols, aromatic amines, acylacetamides, betaketoesters, pyrazolones, homophthalimides, cyanoacetyl compounds, etc. The reactive ethenol group as represented by

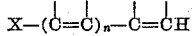

occurs in phenols and naphthols which couple in the ortho position and in the alkali soluble or enol form of most active methylene dye intermediates or color formers. These active methylene groups (—CH₂—) have a hydrogen rendered mobile by the proximity of certain unsaturated groups, for example,

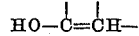

and others. The —CH₂— group is usually present between two such groups, e. g.,

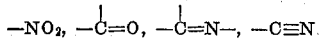

in a cyclic or acyclic system. The enol forms of these examples are

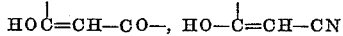

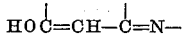

respectively.

The reactive amino ethenyl group

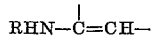

occurs in aromatic amino compounds which couple in the ortho position.

The 4-hydroxy- and 4-amino-1,3-butadienyl groups represented as

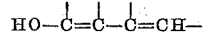

and

occur in phenolic, naphtholic and aromatic amino compounds which couple in the para position.

The term "vinyl alcohol polymer" as used in this application includes the well-known hydroxylated polymers obtainable by polymerizing a vinyl ester, e. g., vinyl acetate, vinyl propionate, vinyl butyrate, vinylchloroacetate, etc., alone or with minor portions, i. e., 10% or less, of an unsaturated interpolymerizable vinyl compound, e. g., ethylene, propylene, butene-1, and other vinyl compounds, e. g., acrylic acid, acrylic acid alkyl esters, alkyl methacrylates, vinyl chloride, vinyl cyanide, and maleic anhydride, followed by partial or complete hydrolysis and, if desired, by further reaction to introduce minor portions of other modifying groups, e. g., acetal, ester, or ether groups, etc. The term "polyvinyl alcohol" is used to include completely hydrolyzed or substantially hydrolyzed (viz., 85% or more) polyvinyl esters, e. g., polyvinyl acetate, polyvinyl propionate, polyvinyl butyrate, polyvinylchloroacetate, obtainable by polymerizing the corresponding monomers alone, followed by hydrolysis. Such polymers have a chain consisting mainly of —CH₂CHOH— groups.

The vinyl alcohol polymer color formers which have been proposed are generally essentially colorless, synthetic polymeric colloids which have colloidal properties and contain a plurality of aliphatic hydroxyl groups usually, vinyl alcohol units (—CH₂—CHOH— groups), in the polymer chain as the predominant hydrophilic group and have as an integral part of their molecular structure color-former nuclei of the foregoing structure. They also preferably contain solubilizing groups from acetalization with an aldehyde containing such a group, e. g., —SO₃Na and CO₂Na. The general structure of these synthetic color forming, water-permeable colloids may be represented as:

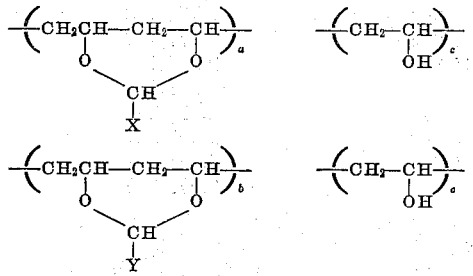

where X is a color-former group or nucleus and Y is a group enhancing hydrophilic character, and the numbers $a$, $b$ and $c$ are selected to contribute the desired degree of colloid properties and to provide the required color density after color-coupling development.

These color formers when used in light-sensitive silver halide layers may constitute the sole binding agents for the silver halide grains or they can be mixed with polyvinyl alcohol, polyvinyl acetals or partially hydrolyzed polyvinyl esters which are water-soluble or hydrophilic in character and/or other natural or synthetic colloid binding agents for silver halide grains including gelatin.

Since the vinyl alcohol polymer color-formers just described and mixtures with polyvinyl alcohol or partially hydrolyzed polyvinyl esters and polyvinyl acetals, do not set or gel like gelatin, soluble boron compounds often are used as gelling agents in coating emulsion layers. Upon color-coupling development, bleaching, fixing, washing, etc., the outer emulsion layer often exhibits undesirable haze and/or reticulation, particularly when elevated temperatures are used in the processing baths.

An object of this invention is to provide an improved process of obtaining color pictures from photographic elements utilizing hydroxyl polymer color formers having activated methylene groups. Another object is to provide such a process which can be used at elevated temperatures. A further object is to provide such a process which is simple and economical. A still further object is to provide such a process which will not entail an additional lengthy or tedious step or steps. Still other objects will be apparent from the following detailed description.

It has been found that color images of polymeric azomethine dyes that are free from haze can be obtained by developing with an alkaline developer solution containing a primary aromatic amino color developing agent, an exposed photographic sheet element bearing at least one water-permeable layer containing a hydroxyl polymer color former having an activated methylene group and prior to completion of the first fixing step, treating the developed element in an aqueous bath containing an aldehyde. Thus, the aldehyde can be incorporated with the aqueous acid stop-bath or in the first fixing bath, after which the element is washed, bleached, washed, fixed, washed and dried.

Various types of aldehydes may be used including saturated, and unsaturated aliphatic and aromatic aldehydes including formaldehyde, acetaldehyde, chlorinated acetaldehyde (chloral hydrate), propionaldehyde, n-butyraldehyde, crotonaldehyde, adipaldehyde; dl glyceraldehyde, o-sulfobenzaldehyde, and glyoxal. The aldehydes should be appreciably soluble in water or a lower aliphatic alcohol, e. g., ethanol, so that 0.05% to 5% by weight of aldehyde based on the water in the acid stop-bath or fixing solution is present.

Photographic elements utilizing hydroxyl polymer color formers of the above type and particularly polyvinyl acetal color formers are described in the following U. S. patents:

| | |
|---|---|
| 2,310,943 | 2,472,910 |
| 2,320,422 | 2,472,911 |
| 2,380,032 | 2,472,913 |
| 2,380,033 | 2,473,403 |
| 2,397,864 | 2,476,988 |
| 2,397,865 | 2,477,462 |
| 2,415,381 | 2,513,189 |
| 2,422,680 | 2,513,190 |
| 2,423,572 | 2,538,257 |
| 2,464,597 | 2,562,527 |
| 2,465,067 | 2,562,528 |
| 2,472,666 | 2,575,182 | and in U. S. applications Martin Ser. No. 172,191, filed July 5, 1950, now U. S. Patent 2,680,730, and Martin Ser. No. 172,192, filed July 5, 1950, now U. S. Patent 2,680,731. These hydroxyl polymer color formers or vinyl alcohol polymers may contain a substantial proportion of o-sulfobenzaldehyde acetal, etc., groups as taught in said patents. In general the linear unit —CH$_2$—CHOH— should represent at least 50% of the polymer chain, between 1 and 35 color-former nuclei should be present for each 100 chain atoms and the polymer chain be in excess of 200 carbon atoms. Of course, minor amounts of lower molecular weight polymers may be present. In addition, the layers may contain from ½% to 50% by weight of a water-soluble or hydrophilic polyvinyl alcohol or a partially hydrolyzed polyvinyl ester or a polyvinyl acetal, e. g., the sodium o-sulfobenzaldehyde acetal of polyvinyl alcohol and p-hydroxybenzaldehyde acetal of polyvinyl alcohol.

In the following examples p-amino-N-diethylaniline monohydrochloride is used as the color coupling developing agent. The invention, however, is not limited to the use of this particular agent as other derivatives of phenylenediamine can be used, particularly the asymmetric dialkyl p-phenylenediamines wherein the alkyl groups contain 1 to 4 carbon atoms, p-amino-N-dimethylaniline, p-amino-N-dibutylaniline, etc. Other developing agents which may be used include p-phenylenediamine itself, p-methylaminoaniline, p-ethylaminoaniline, p-aminophenol, N,N - diethyl - o - phenylenediamine, chloro - p - phenylenediamine, 1,2,5 - toluylenediamine, 2 - amino - 5 - diethylamino - toluene, p - amino - N - phenylmorpholine, N-p - aminophenylpiperidine, N - methyl - N - hydroxyethyl-p - phenylenediamine, N - butyl - N - hydroxyethyl - p-phenylene - diamine, 2 - amino - 5 - (N - butyl - N - hydroxyethyl)aminotoluene, beta - gamma -dihydroxy - propyl - p - phenylenediamine; N - hydroxyalkylated p - phenylenediamines, e. g., unsymmetrical N:N - di - (hydroxyethyl) - p - phenylenediamine, 2 - amino - 5 - (N - hydroxyethyl - N - butyl)aminotoluene, N - ethyl - N - hydroxyethyl - p - phenylenediamine, N:N - di - (hydroxyethyl) - p - phenylenediamine, N - methyl - N - (γ - sulfophenylthiopropyl) - p - phenylenediamine, N - methyl-N - (γ - disulfophenylthiopropyl) - p - phenylenediamine, N - ethyl - N - (γ - sulfophenylthiopropyl) - p - phenylenediamine, N - ethyl - N - (γ - disulfophenylthiopropyl)-p - phenylenediamine, N - propyl - N - (γ - sulfophenylthiopropyl) - p - phenylenediamine, N - propyl - N - (γ-disulfophenylthiopropyl) - p - phenylenediamine, N - isopropyl - N - (γ - sulfophenylthiopropyl) - p - phenylenediamine, N - isopropyl - N - (γ - disulfophenylthiopropyl)-p - phenylenediamine, N - butyl - N - (γ - sulfophenylthiopropyl) - p - phenylenediamine, N - butyl - N - (γ-disulfophenylthiopropyl) - p - phenylenediamine, the N-(p-aminophenyl)hexamethylenimines of Raasch 2,612,500 including N - (p - aminophenyl)hexamethylenimine, N-(p - aminophenyl) - 4 - methoxyhexamethylenimine, N-(p - aminophenyl) - 4 - dimethylaminohexamethylenimine, etc. These aromatic amino developing agents in the form of their organic or inorganic acid salts may be used in the preparation of the developing solutions. The salts are, in general, more stable than the free bases. As examples of suitable salts, mention is made of the hydrochlorides, sulfates, acetates, etc.

The invention is further illustrated but is not intended to be limited by the following examples.

*Example I*

A multilayer film of the type described in the "Soc. of Motion Picture and Television Engineers," vol. 55A, 455–475 (1950) and in Example V of Alles and Saner app. Ser. No. 290,332, filed May 27, 1952, now U. S. Patent No. 2,698,240, except that a cellulose acetate film base was used which had three polyvinyl acetal color formers in three respective light-sensitive layers, two of which contained activated or active methylene groups, was exposed to a multicolor object field and a strip was then processed as follows:

1. Developed for a period of 10–12 minutes at 70° F. in a solution made by admixing the following:

| | Grams |
|---|---|
| p-Amino-N-diethylaniline·monohydrochloride | 2.5 |
| Sodium sulfite, anhydrous | 10.0 |
| Sodium carbonate, monohydrate | 47.0 |
| Potassium bromide | 2.0 |
| Water to make 1000.0 ml. | | pH=10.5 (approx.).

2. The surface water removed by a blast of air.

3. Treated for 2–4 minutes in a stop-bath made by admixing the following:

Disodium hydrogen phosphate · dodecahydrate
_____grams__ 40.0
Sodium sulfite, anhydrous_____do____ 10.0
Borax _____do____ 6.0
Glacial acetic acid_____ml____ 40.0
Water to make 1000.0 ml.
Adjust pH to 4.0.

4. Rinsed in water for 5–10 seconds or if desired, subjected to a blast of air.

5. Fixed for about 6 minutes in a solution made by adding 24 ml. of a 20% solution of n-butyraldehyde to an admixture of the following components:

Sodium hyposulfite, crystals_____grams__ 80.0
Borax _____do____ 10.0
Sodium sulfite, anhydrous _____do____ 5.0
Glacial acetic acid _____ml__ 4.0
Water to make 1000.0 ml.
Adjust pH to 9.5.

6. Washed with water for about 5 minutes.

7. Bleached for about 5 minutes in a solution made by admixing the following components:

Grams
Potassium ferricyanide _____ 100.0
Boric acid _____ 10.0
Borax _____ 5.0
Water to make 1000.0 ml.
pH=7.0 to 7.5.

8. Washed with water for about 2 minutes.

9. Fixed for about 5 minutes in a solution made from the following components:

Sodium hyposulfite, crystals_____grams__ 200.0
Water to make 1000.0 ml.
pH=8.0 (approx.).

10. Washed in water for about 5 minutes, and
11. Dried.

The multicolor picture was essentially free from haze as compared with a similarly exposed strip of control film processed in an identical manner with the exception no n-butyraldehyde was added in step 5. The control film on the other hand had objectionable haze.

*Example II*

A film of the type described in Example I was exposed to a multicolor object field and a strip processed in the same manner as that of Example I except the n-butyraldehyde was replaced with crotonaldehyde. A strip of exposed control film was processed in the same manner except the fixer of step 5 did not contain crotonaldehyde. The control strip had an objectionable color haze in the final picture, whereas the first strip was free from objectionable haze.

*Example III*

A film of the type described in Example I was exposed to a multicolor object field and a strip processed in the same manner as that of Example I except that the n-butyraldehyde was replaced with adipaldehyde. A strip of exposed control film was processed in the same manner except the fixer of step 5 did not contain adipaldehyde. The control strip had an objectionable color haze in the final picture, whereas the first strip was free from objectionable haze.

*Example IV*

A film of the type described in Example I was exposed to a multicolor object field and a strip processed in the same manner as that of Example I except that the n-butyraldehyde was replaced with 4 grams of dl-glyceraldehyde. A strip of exposed control film was processed in the same manner except the fixer of step 5 did not contain dl-glyceraldehyde. The control strip had an objectionable color haze in the final picture, whereas the first strip was free from objectionable haze.

*Example V*

A film of the type described in Example I was exposed to a multicolor object field and a strip processed in the same manner as that of Example I except that the n-butyraldehyde was replaced with sodium o-sulfobenzaldehyde. A strip of exposed control film was processed in the same manner except the fixer of step 5 did not contain sodium o-sulfobenzaldehyde. The control strip had an objectionable color haze in the final picture, whereas the first strip was free from objectionable haze.

*Example VI*

A motion picture film of the type described in Example I was exposed to a multicolor object field and a strip processed in the same manner as that of Example I except that 24 ml. of a 20% ethanol solution of crotonaldehyde was added to the acid stop-bath of step 3 and the first fixing bath of step 5 did not contain n-butyraldehyde. A strip of similarly exposed control film was processed in the same manner except that the acid stop-bath did not contain crotonaldehyde. The control strip had an objectionable color haze in the final picture, whereas the first strip was free from objectionable haze.

*Example VII*

A motion picture film of the type described in Example I was exposed to a multicolor object field and a strip processed in the same manner as that of Example I except that 24 ml. of a 20% ethanol solution of n-butyraldehyde was added to the acid stop-bath of step 3 and the first fixing bath of step 5 did not contain n-butyraldehyde. A strip of similarly exposed control film was processed in the same manner except that the acid stop-bath did not contain n-butyraldehyde. The control strip had an objectionable color haze in the final picture, whereas the first strip was free from objectionable haze.

*Example VIII*

A motion picture film of the type described in Example I was exposed to a multicolor object field and a strip processed in the same manner as that of Example I except that 4 grams of sodium o-sulfobenzaldehyde was added to the acid stop-bath of step 3 and the first fixing bath of step 5 did not contain n-butyraldehyde. A strip of similarly exposed control film was processed in the same manner except that the acid stop-bath did not contain sodium o-sulfobenzaldehyde. The control strip had an objectionable color haze in the final picture, whereas the first strip was free from objectionable haze.

*Example IX*

A motion picture film of the type described in Example I was exposed to a multicolor object field and a strip processed in the same manner as that of Example I except that 4 grams of dl-glyceraldehyde was added to the acid stop-bath of step 3 and the first fixing bath of step 5 did not contain n-butyraldehyde. A strip of similarly exposed control film was processed in the same manner except that the acid stop-bath did not contain dl-glyceraldehyde. The control strip had an objectionable color haze in the final picture, whereas the first strip was free from objectionable haze.

Among the useful cyan or blue-green color formers containing reactive or activated methylene groups which may be present in the photographic films processed in accordance with this invention are:

3-(1 - hydroxy - 2 - naphthamido)benzaldehyde polyvinyl acetal, m-(1-acetoxy-2-napthalsulfonamido)benzaldehyde polyvinyl acetal,
o-, m-, and p-acetoacetaminobenzaldehyde polyvinyl acetals, 2-hydroxy-3-methyl-5-benzyl polyvinyl acetal, and 3-(1-ethylcarbonato-2-naphthalsulfonamido)benzaldehyde polyvinyl acetal.

Similarly, specifically useful magenta color formers include:

1-(m-aminophenyl)-3 - methylpyrazolonoylaminodbenzaldehyde polyvinyl acetal, m-[p-(5-acetoxy-3-methyl-1 - pyrazolyl)benzamido]benzaldehyde polyvinyl acetal, m-[p-(5-benzoxy-3 - methyl - 1 - pyrazolyl)phenoxyacetamido]benzaldehyde polyvinyl acetal, and m-[p-(5-ethylcarbonat-3-methyl-1 - pyrazolyl)benzamido] benzaldehyde polyvinyl acetal.

While aldehydes have been used in fixing solutions as hardeners for the gelatin binding agent in the photographic silver halide layer to be treated, the situation is not analogous because it could not be concluded from the simple gelatin hardening action that color haze could be eliminated in a photographic film containing a polymeric color former having activated acyclic or intracyclic methylene groups. In the hardening action the hardener apparently reacts with groups directly attached to the gelatin compounds. The aldehydes do not have any significant reaction with the hydroxyl groups in the polymers in the emulsion layers. This can be established by adding a small amount of crotonaldehyde (1) to a 5% aqueous solution of polyvinyl alcohol, and (2) to a 5% aqueous solution of the polyvinyl alcohol color former containing an activated methylene group. In case (1) there is no significant increase in viscosity, whereas in case (2) the polyvinyl acetal color former is converted to a gel.

It is emphasized that while the aldehydes when used in the acid stop-bath or in the first fixing bath will eliminate processing haze they do not prevent processing haze when added to the bleach or second fixing bath.

An advantage of this invention is that it enables one to expose and process a photographic element bearing a layer composed essentially of a vinyl alcohol polymer containing color-former nuclei having an intracyclic or acyclic activated methylene group, to form a polymeric azomethine dye image which is free from haze.

Another advantage is that it enables one to process such a film at elevated temperatures, e. g., 75° to 95° F. without forming any undesirable haze or causing any significant reticulation. A further advantage is that the process is simple and can be used with the existing processing apparatus. A further advantage is that the additional chemicals used are economical and readily available. Still other advantages will be apparent from the above.

What is claimed is:

1. In a process of producing a color picture in an exposed photographic element having at least one water-permeable colloid layer essentially composed of vinyl alcohol polymer and dispersed silver halide grains, a substantial proportion of said polymer being a vinyl alcohol polymer color-former having an activated methylene group, including the steps of developing said exposed element in an aqueous developer solution containing a primary aromatic amino color developing agent, treating the developed element in an aqueous acid stop bath, treating the developed element in an aqueous fixing bath, bleaching the fixed element, fixing the bleached element, washing and drying said element; the step which comprises incorporating an aldehyde with one of said aqueous treating baths prior to completion of the first step of fixing the developed element.

2. A process as set forth in claim 1 wherein said water-permeable colloid layer containing a vinyl alcohol polymer color-former having an activated methylene group is in an outermost color-former layer in said photographic element.

3. A process as set forth in claim 2 wherein said element is a photographic film.

4. In a process of producing a color picture in an exposed photographic film having at least one water-permeable colloid layer essentially composed of a vinyl alcohol polymer and dispersed silver halide grains, a substantial proportion of said polymer being a vinyl alcohol polymer color-former having an activated methylene group, including the steps of developing said exposed film in an aqueous developer solution containing a primary aromatic amino color developing agent, treating the developed film in an aqueous acid stop bath, treating the developed film in an aqueous fixing bath, bleaching the fixed film, fixing the bleached film, washing and drying said film; the step which comprises incorporating an aldehyde with one of said aqueous treating baths prior to completion of the first step of fixing the developed film.

5. In a process of producing a color picture in an exposed photographic film having at least one water-permeable colloid layer essentially composed of a vinyl alcohol polymer and dispersed silver halide grains, a substantial proportion of said polymer being a vinyl alcohol polymer color former having an activated methylene group, including the steps of developing said exposed film in an aqueous developer solution containing a primary aromatic amino color developing agent, treating the developed film in an aqueous acid stop-bath, treating the developed film in an aqueous fixing bath, bleaching the fixed film, fixing the bleached film, washing and drying said film; the step which comprises incorporating an aldehyde with the first fixing bath.

6. A process as set forth in claim 5 wherein said aldehyde is crotonaldehyde.

7. In a process of producing a color picture in an exposed photographic film having at least one water-permeable colloid layer essentially composed of a vinyl alcohol polymer and dispersed silver halide grains, a substantial proportion of said polymer being a vinyl alcohol polymer color former having an activated methylene group, including the steps of developing said exposed film in an aqueous developer solution containing a primary aromatic amino color developing agent, treating the developed film in an aqueous acid stop bath, treating the developed film in an aqueous fixing bath, bleaching the fixed film, fixing the bleached film, washing and drying said film; the step which comprises incorporating an aldehyde with the acid stop-bath.

8. In a process of producing a color picture in an exposed photographic element having at least one water-permeable colloid layer composed of a mixture of polyvinyl alcohol and a polyvinyl acetal color former having an activated methylene group in the color-former nuclei, including the steps of developing said exposed element in an aqueous developer solution containing a primary aromatic amino color developing agent, treating the developed element in an aqueous acid stop bath, treating the developed element in an aqueous fixing bath, bleaching the fixed element, fixing the bleached element, washing and drying said element; the step which comprises incorporating an aldehyde with one of said aqueous treating baths prior to completion of the first step of fixing the developed element.

9. A process as set forth in claim 8 wherein said aldehyde is crotonaldehyde.

10. A process as set forth in claim 8 wherein said aldehyde is n-butyraldehyde.

11. A process as set forth in claim 8 wherein said aldehyde is sodium o-sulfobenzaldehyde.

12. A process as set forth in claim 8 wherein said aldehyde is dl-glyceraldehyde.

References Cited in the file of this patent

UNITED STATES PATENTS

| | | |
|---|---|---|
| 2,397,864 | Jennings | Apr. 2, 1946 |
| 2,397,865 | Jennings | Apr. 2, 1946 |
| 2,518,686 | Harsh et al. | Aug. 15, 1950 |
| 2,567,750 | Woodward | Sept. 11, 1951 |